July 8, 1958 D. M. SWINGLE 2,842,039
MOTOR VEHICLE CONTROLS
Filed May 8, 1950 6 Sheets-Sheet 1
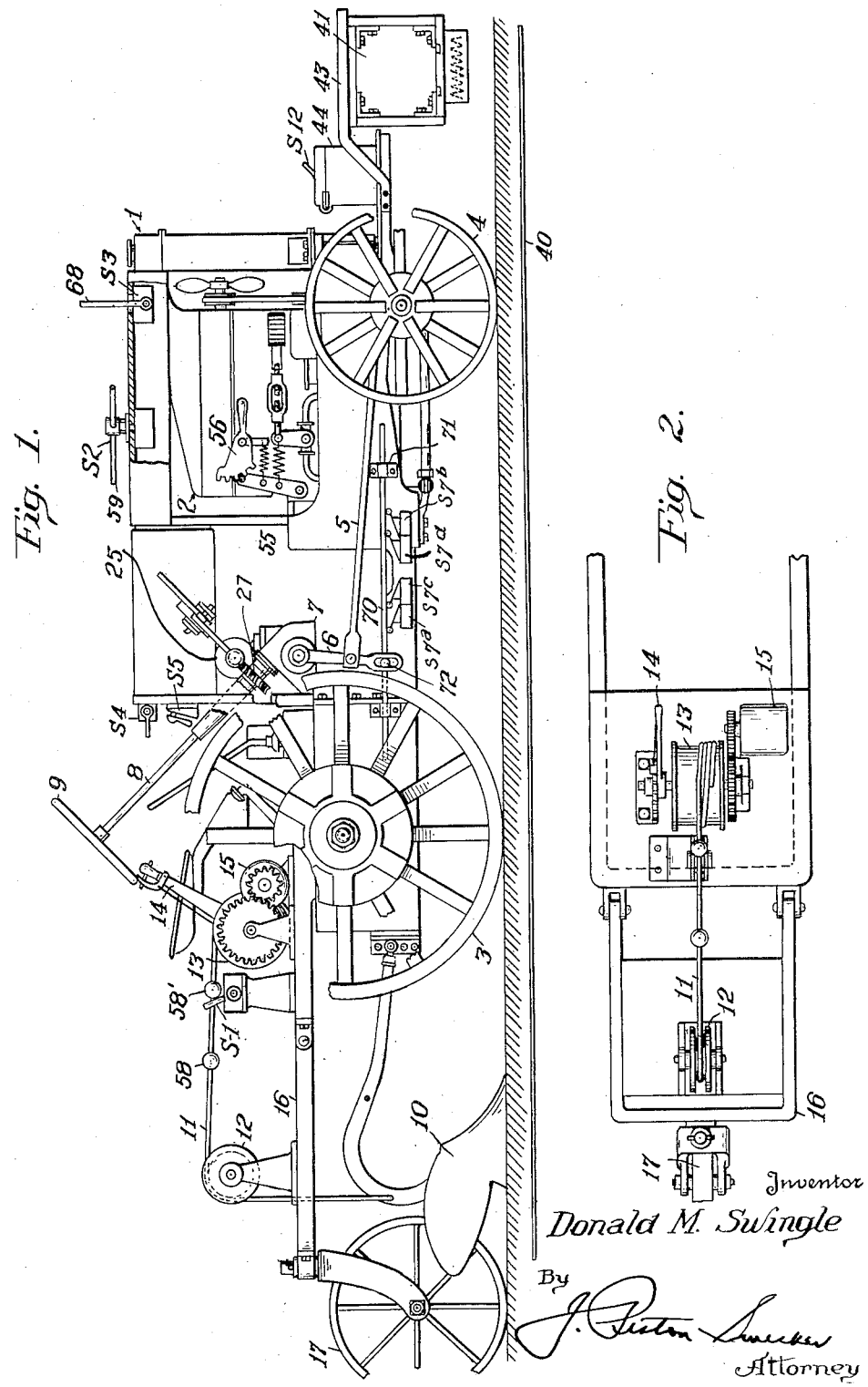
Inventor
Donald M. Swingle
By
Attorney July 8, 1958 D. M. SWINGLE 2,842,039
MOTOR VEHICLE CONTROLS
Filed May 8, 1950 6 Sheets-Sheet 2
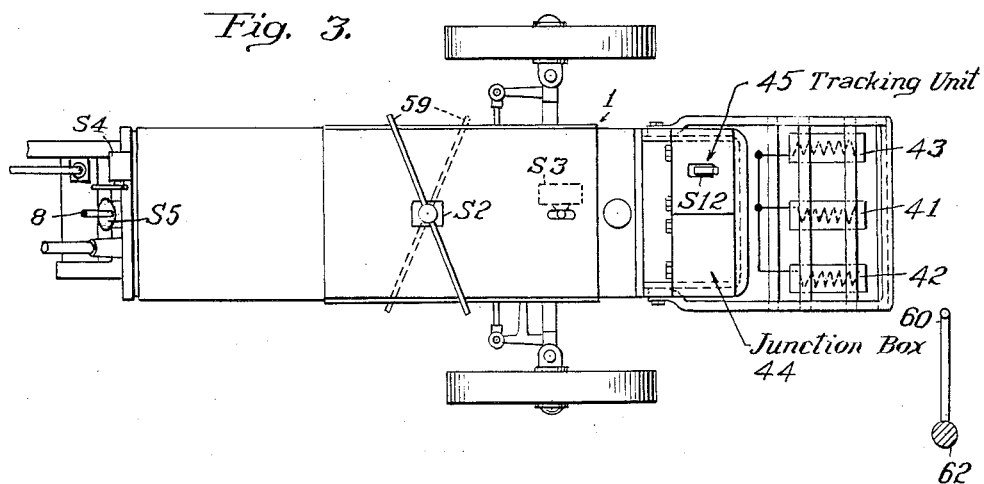
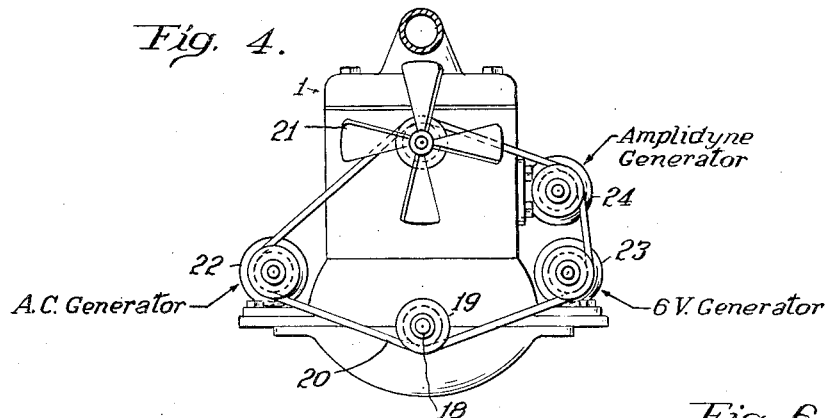
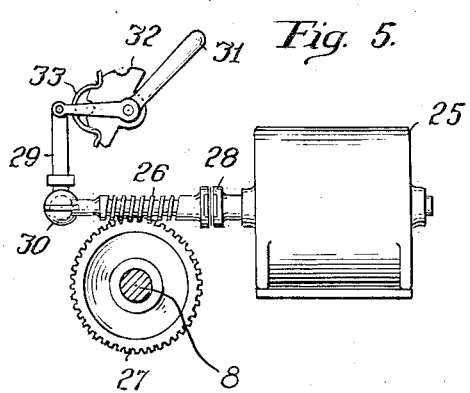 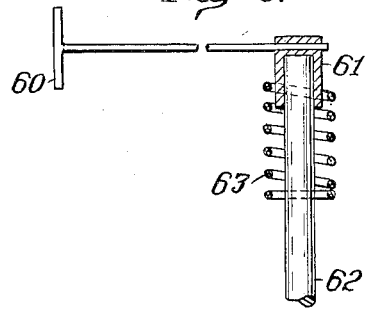
Inventor
Donald M. Swingle
Attorney

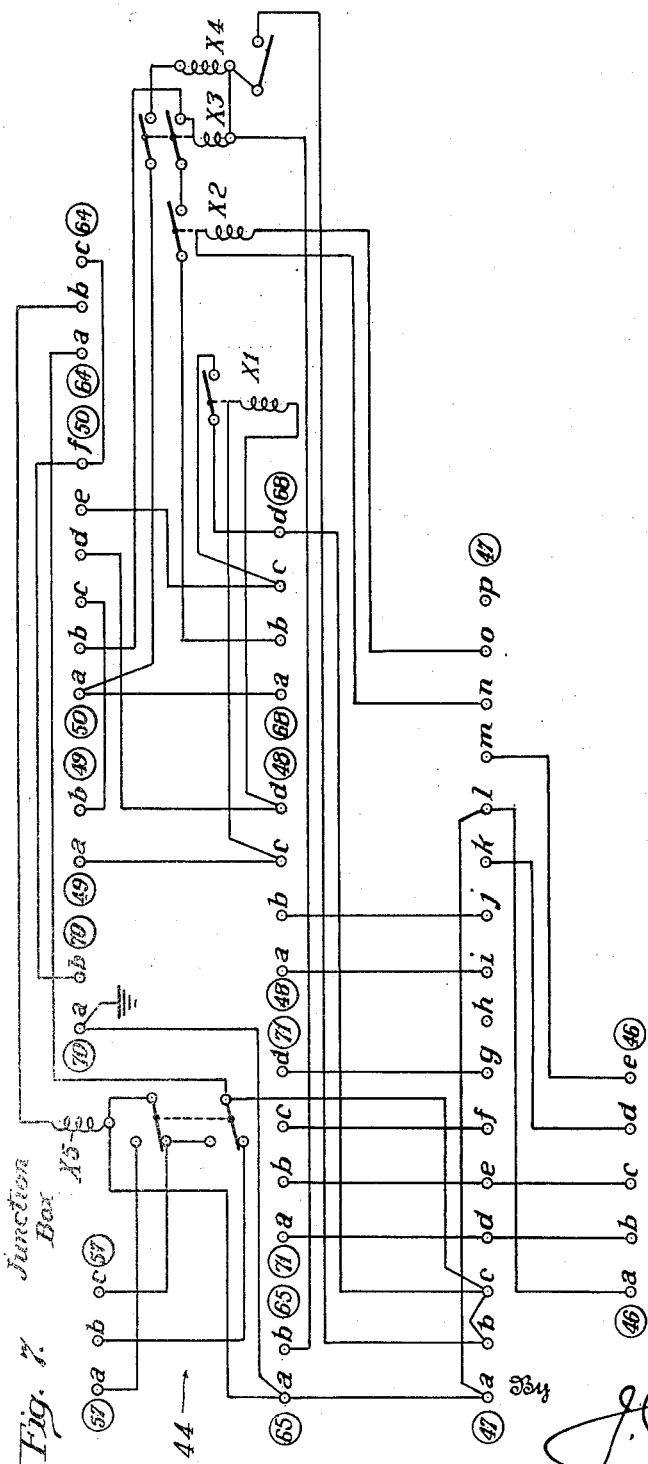

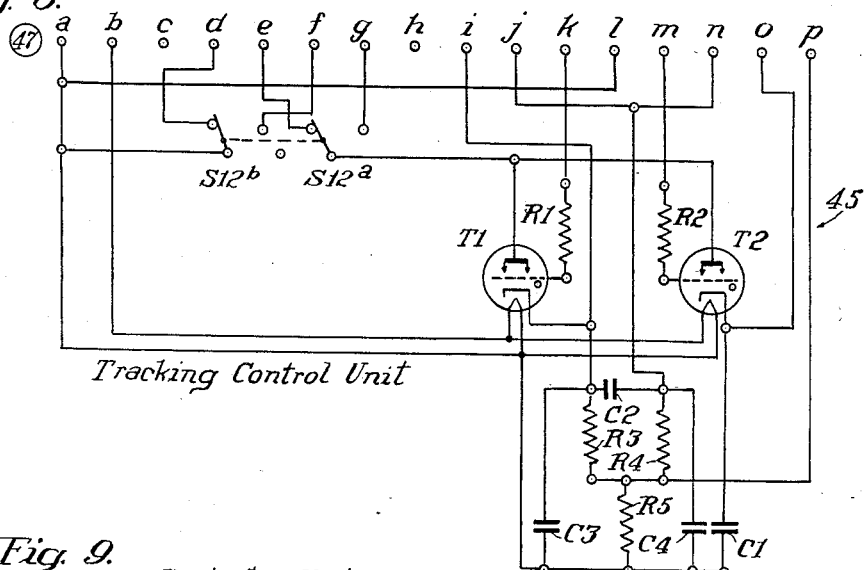
Fig. 8.
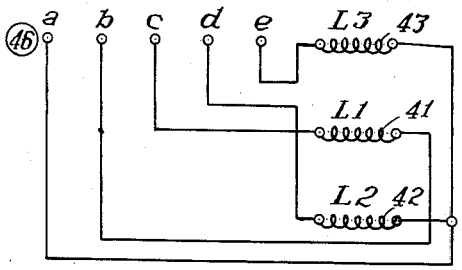
Fig. 9.
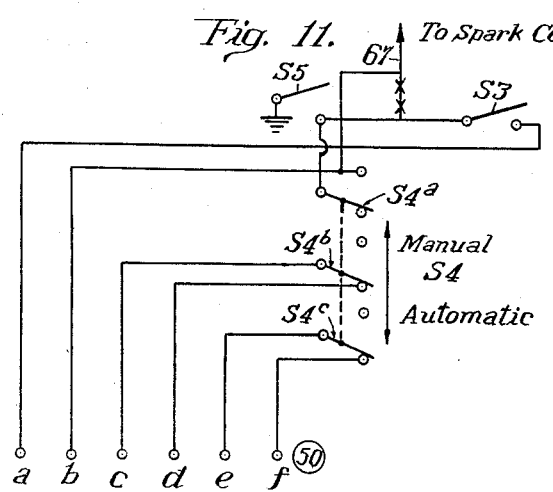
Fig. 10.
Fig. 11.
Fig. 12.
Inventor
Donald M. Swingle July 8, 1958      D. M. SWINGLE      2,842,039
MOTOR VEHICLE CONTROLS
Filed May 8, 1950      6 Sheets-Sheet 5
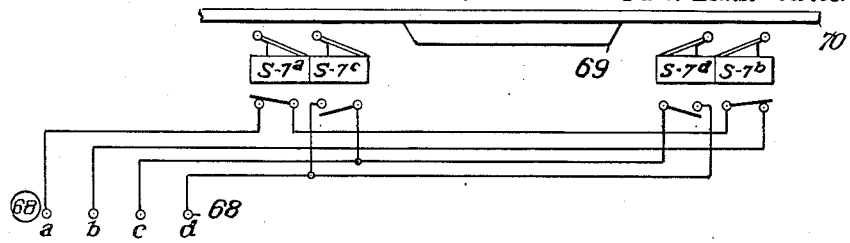
Fig. 13. Turn Limit Switches
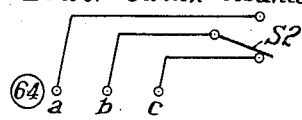
Fig. 14.
External — Raise and Lower Switch Mounted on Hood
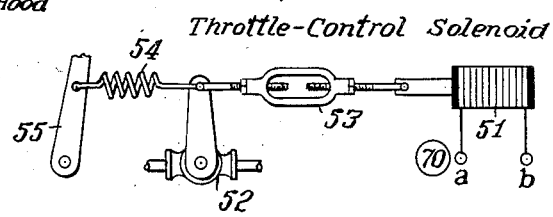
Fig. 15.
Throttle-Control Solenoid
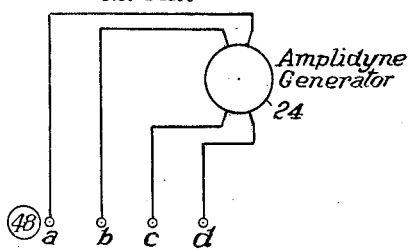
Fig. 16.
Amplidyne Generator Circuit
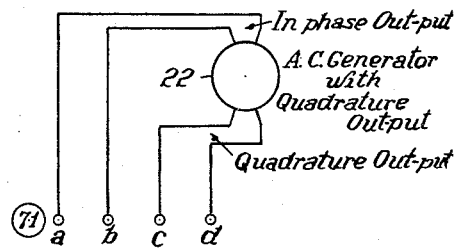
Fig. 17.
A. C. Generator Circuit with Quadrature Out-put
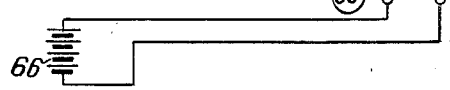
Fig. 18.    Storage Battery Circuit To Junc. Box
Inventor
Donald M. Swingle
By
ATTORNEY July 8, 1958

D. M. SWINGLE 2,842,039

MOTOR VEHICLE CONTROLS

Filed May 8, 1950

INVENTOR
Donald M. Swingle
BY
ATTORNEY

United States Patent Office 2,842,039
Patented July 8, 1958

2,842,039

MOTOR VEHICLE CONTROLS

Donald M. Swingle, Cambridge, Mass.

Application May 8, 1950, Serial No. 160,732

4 Claims. (Cl. 97—46.03)

This invention relates to improvements in motor vehicle controls adapted particularly for controlling the direction and action of a tractor, or other land or air vehicle, that is operated by a motor to produce automatic operation thereof. One application of the invention is to a farm-type tractor, not only to control the direction and speed of the vehicle, but also the action of farm implements and other devices connected with the tractor.

One object of the invention is to provide for the guiding of vehicles automatically along a given path which follows a previously set out, laid, buried or otherwise provided metallic or non-metallic wire, tape or other track, along, in or above the earth, whereby the tracking of the vehicle along the path will be accomplished automatically without mechanical connection therewith.

A further object of the invention is to provide for the automatic stopping of the vehicle if it should lose or leave the path to prevent its striking obstructions or other objects upon deviation therefrom.

A still further object of the invention is to provide for the stopping of the vehicle automatically when it reaches a predetermined position with respect to the path or track so that it may be moved to a predetermined point thereon and then will stop automatically.

Still another object of the invention is to control the turning of the vehicle as it follows the path so as to reduce its speed when making a sharp turn therein, and to stop the vehicle if it should make an excessive turn.

Still another object of the invention is to provide for the control of the vehicle whereby it follows either of two or more selected paths at the will of the operator according to the setting of the control thereof.

Still another object of the invention is to control the action of implements connected with the vehicle so as to bring the implement into operating position at the desired point along the path, as for instance when the vehicle enters a field in which work is to be performed, as well as to raise or lower the implement automatically according to the action that is to be performed, as when the vehicle enters or leaves the field, or is making a sharp turn or traveling along a lane or road.

These and other objects of the invention are accomplished in an embodiment thereof as hereinafter described more in detail wherein a vehicle, such as a farm tractor, is provided with a control which acts automatically not only to control the direction and speed of the vehicle, but also the action of the implements connected therewith, without mechanical or positive connections with a track or other guiding means that would act mechanically for directing the vehicle along the guided path. On the contrary, the control acts electro-magnetically for detecting and tracking a previously laid-out, buried or otherwise provided metallic or non-metallic wire, tape or other track along which the vehicle is guided without positive or mechanical connection therewith.

An embodiment of the invention is illustrated in the accompanying drawings, in which:

Fig. 1 is a side elevation of a farm tractor and plow attachment to which an embodiment of this invention is shown as applied;

Fig. 2 is a top plan view of the rear end portion of the tractor and plow attachment including the raising and lowering means therefor;

Fig. 3 is a partial plan view of the front end portion of the tractor showing the tracking control unit and detector unit therefor;

Fig. 4 is a front elevation of the tractor engine showing the driving connection of the several generators;

Fig. 5 is a detail side elevation of the steering motor disengaging device;

Fig. 6 is a side elevation, partly in section, of an outside post-mounted control arm;

Fig. 7 is a diagrammatic view of wiring connections of the junction box;

Fig. 8 is a similar view of the tracking control unit;

Fig. 9 is a similar view of the detector unit;

Fig. 10 is a similar view of the steering motor;

Fig. 11 is a similar view of the manual-automatic master switch;

Fig. 12 is a similar view of the raising and lowering limit switch;

Fig. 13 is a similar view of the turn limit switches;

Fig. 14 is a similar view of the external raising and lowering switch that is shown in this embodiment as mounted on the hood of the tractor;

Fig. 15 is a fragmentary side elevation of the throttle control mechanism;

Fig. 16 is a diagrammatic view of the wiring connections for the amplidyne generator;

Fig. 17 is a similar view of the A. C. generator connections; and

Fig. 18 is a similar view of the storage battery connections.

Figure 19:
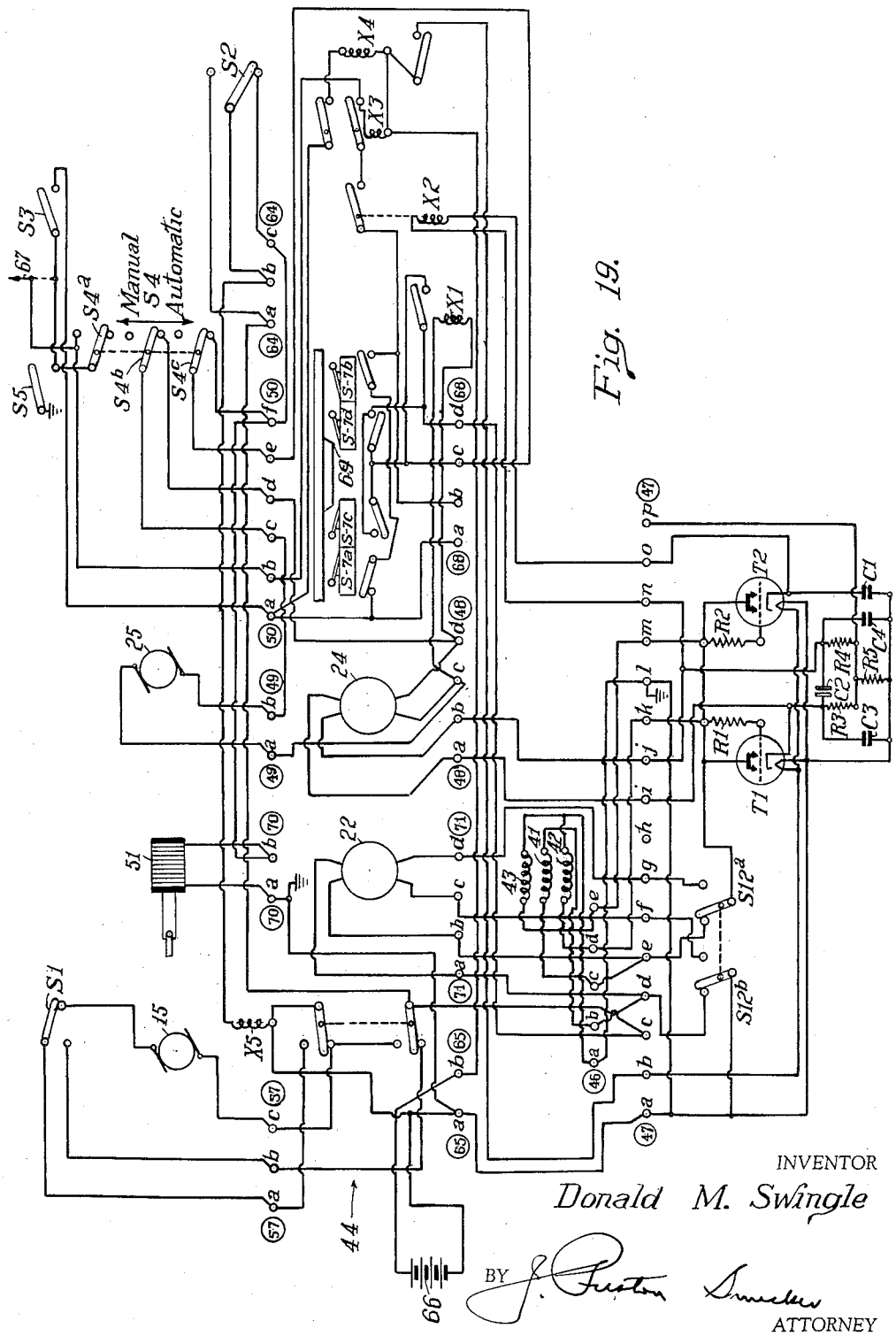
Fig. 19 is a schematic wiring diagram of the control circuits utilized in the instant invention.

The invention is shown, merely for the purpose of illustration of one embodiment thereof, as applied to the operation of a conventional farm tractor. It is recognized, however, that it may be applied to other types of power operated devices, land or air vehicles, etc., for automatic control thereof.

In this embodiment, the tractor or vehicle is designated generally by the numeral 1, and is provided with a power plant or engine 2 for driving the wheels 3. The steering wheels are shown at 4 at the forward end of the vehicle, swiveled to the frame of the vehicle for joint swinging movement relative thereto in the normal way. The steering mechanism for the wheels 4 includes a connecting rod 5 connected with the axles thereof and extending to an arm 6, that is connected to gearing in a gear box 7. The gearing also has a steering shaft 8 connected therewith having a steering wheel 9 thereon for manual steering of the tractor.

The vehicle 1 may be used for any desired draft purposes, such as for handling an implement, shown as a plow 10 connected with the frame of the vehicle. Any suitable or desired means may be used for raising or lowering the implement, but for the purpose of illustration, I have shown such means as including a cable 11 connected at one end with the implement 10, and extending therefrom over a sheave 12, to a drum 13. The drum 13 is adapted for manual operation by a hand lever 14, or alternately, power operation by a motor 15, as desired. This implement support mechanism is shown as supported by a frame 16, attached at one end to the frame of the tractor and supported at its opposite end on a caster wheel 17.

The foregoing is illustrative of conventional construction, to which the invention may be applied, and may have other parts or mechanisms substituted therefor which may be useful in connection with this invention.

The engine 2 is adapted for driving several generators, as shown in Fig. 4. The crankshaft 18 of the engine has a pulley 19 thereon with a belt 20 passing therearound and over the pulley of the fan 21. The belt 20 also passes around a drive pulley of an A. C. current generator 22, and over the drive pulleys of a 6 v. generator 23 and an amplidyne generator 24, as hereinafter described.

The steering mechanism is adapted for power operation by a control motor 25 (see Figs. 1 and 5). The motor 25 has a worm 26 on the armature shaft thereof in mesh with a worm gear 27 fixed to the steering shaft 3. While the worm 26 is shown in Fig. 5 in mesh with the worm gear 27, this worm 26 is connected with the armature shaft of the motor 25 through a flexible coupling 28 to permit swinging of the worm 26 out of mesh with the worm gear 27. A link 29 has a swiveled connection 30 with the shaft of the worm 26 that will permit free rotation of the shaft relative to the link. The opposite end of the link 29 is pivoted to a lever 31 pivotally mounted on a segment 32. The segment 32 has a notched periphery upon which a spring catch 33 rides and is connected with the lever 31, normally tending to hold the lever in a set position and yielding to permit movement of the lever relative to the segment 32.

The vehicle is adapted for automatically following a predetermined path along a course provided by guide path means, which may be provided by a conductor, such as a wire 40 (Fig. 1). The wire 40 may be laid upon or buried in the ground, or mounted in supported position above the ground in such position that the tractor may be guided thereby. It may be either above or below the tractor or at either side thereof in operative relation thereto.

Mounted on the vehicle, preferably at the front thereof, or in such other position as to be in proximity to the wire 40, is detector unit (Figs. 3 and 9), comprising a transmitting coil 41 preferably centrally located with respect to the tractor and the wire 40, and a pair of receiving coils 42 and 43 symmetrically spaced on opposite sides of the transmitting coil 41. These coils 42 and 43 will receive signals transmitted from the coil 41 and reflected by the wire 40, which signals will vary at the respective coils 42 and 43 according to the relative spacing of these coils from the wire 40, being uniform when the coils are equally spaced therefrom. The wiring diagram for the detector unit is shown in Fig. 9. The several orientations possible for the receiving coils 42 and 43 relative to the transmitting coil 41 are pointed out below.

The means for automatically controlling the vehicle electrically, in addition to the detector unit, includes a junction box unit, generally designated at 44, and shown in Fig. 7, and a tracking control unit 45, shown in Fig. 8.

Throughout the specification and drawings, the wiring diagrams are shown conventionally with terminals designated by the same symbols on the several units adapted to be connected directly together or by cable.

The transmitting coil 41 is excited by A. C. voltage impressed thereon from the A. C. generator 22, and, in the example shown, creates a magnetic field near the ground adjacent or in front of the vehicle, which field is detected by the units 42 and 43. This magnetic field is distorted by the buried wire 40. If the wire 40 is located directly beneath the transmitting coil 41, the effect of the magnetic field on the detector units 42 and 43 will be identical. If, however, the wire 40 is located laterally on either side of the transmitting coil 41, then the magnetic field on that side will be increased, and the voltage induced in the secondary or receiving coil 42 or 43 on the corresponding side likewise will be increased. This will depend on the relative orientation of the transmitting coil 41 with respect to the receiving coils 42 and 43 and the wire 40.

The generator 22 has in-phase output connections 71a, 71b, and quadrature output connections 71c, 71d, to supply current to the coil 41. The connections 71a and 71b are connected with contacts 46b and 46c, respectively, and to contacts 47d and 47e, respectively, while the connectors 71c and 71d supply current to the connections 47f and 47g. The connection 46a is connected to the common ground bus, i. e. to 47l, 47a, 65a. The 6-volt storage battery 66 is connected to terminals 65a, 65b. The 6-volt generator 23 is connected with the storage battery 66 in the conventional manner with cutout relay, etc. Details of this are not shown.

The signals from the respective receiving coils 42 and 43 are directed along wires to contacts 46a, 46d and 46e of the detector unit shown in Fig. 9. The contacts 46d and 46e are shown also on the junction box 44 in Fig. 7 as connected through wires with contacts 47k and 47m, respectively, which contacts 47k and 47m are connected through wires with the tracking control unit generally designated at 45 and illustrated diagrammatically in Fig. 8. As shown in this embodiment, each receiving coil 42 and 43 controls one thyratron, designated at T1 and T2 in Fig. 8. This control is through resistances R1 and R2 to the grids of the respective thyratron. These resistances limit the grid current through the thyratrons in the usual way.

As an example, if the wire 40 be located between the coils 41 and 43, the left hand receiving coil, as viewed in Figs. 3 and 9, a larger voltage is induced in the coil 43 than in the coil 42. This larger voltage is impressed on the grid of the thyratron T2 through the connections 46e, 47m and resistor R2. Similarly, the smaller voltage induced in the detector coil 42 is impressed on the grid of the thyratron T1 through the connections 46d, 47k, and resistor R1.

These voltages cause the thyratron T2 to act sooner than the thyratron T1, in the positive half of the plate voltage cycle, thus causing them to conduct more and less current, respectively, therethrough. The sum of the currents in the two tubes is impressed on the resistor R5 providing bias voltage for the two thyratrons and some mutual coupling therebetween which increases the apparent signal in the tube that receives the greater signal from its corresponding detector coil, and likewise decreases the apparent signal in the tube receiving the smaller signal from its detector coil. Capacitors C1, C2, C3 and C4 are included in the output circuit to smooth out the current pulses into approximately D. C. current.

The output from the two thyratrons T1 and T2 is impressed on the excitation coil of the amplidyne generator 24 (see Fig. 16) through the connections 47i and 47j, connected in turn (see Fig. 7) to contacts 48a and 48b. The amplidyne generator 24 is driven by the tractor motor 2, as described above and shown in Fig. 4. The output from the amplidyne generator 24 is a D. C. current which drives the D. C. steering motor 25 through the connections 48c and 48d (Fig. 16), that are connected, respectively, with contacts 49a and 50d. A switch S4b, hereinafter described, connects the contacts 50d and 50c, which latter in turn is connected by a wire to the contact 49b. The contacts 49a and 49b are connected with the steering motor 25, as shown in Fig. 10.

The actuating winding of the relay X2 is connected in the cathode circuit of the tube T2 through the contacts 47n and 47o, so that if no signal is received, due either to failure of the circuit or loss of the guide path, the entire equipment will be turned off and the device rendered inoperative. Approximately half of the difference in the current of the two thyratrons will flow through the amplidyne excitation coil through the connections 47i, 47j, 48a, 48b and the amplidyne generator circuit shown in Fig. 16. The filament excitation for the thyratrons is supplied through the connections 47a, 47b. 47a is connected to 65a, the common ground, and the storage battery 66. 47b is connected to 65b and the storage battery through the contacts of relay X4. Plate supply voltage for the thyratrons is supplied through 47d, 47e, 47f, and 47g, connected to 71a, 71b, 71c, and 71d, respectively, and thence to the A. C. generator 22 (Fig. 17). When switch S12 is in the position shown (Fig. 8), the plate supply voltage is in phase with the voltage supplied to the transmitting coil 41. In the other position S12 will supply the quadrature phase to the plates of the thyratrons.

If a stronger signal is received in the right hand coil 42, a larger current is directed to the corresponding thyratron T1, causing an output current from the amplidyne generator 24 which acts to turn the motor 25 in such direction as to steer the tractor toward the right. As the vehicle thus is turned toward the right, the right hand coil is moved gradually away from over the wire 40 and its magnetic signal gradually decreases, while that of the left hand coil increases.

Thus, the vehicle will "hunt" the wire down the field and follow its path, changing its course to the right or left as need be so as to be maintained automatically on the course provided by the wire. If desired, additional detection coils and circuits may be added in order to make a more precise servo system and to smooth out the path of movement and to maintain the uniform direction of the tractor along the path.

The manual-automatic switch S4, shown in Figs. 1 and 3, is mounted on the dash of the tractor in the embodiment illustrated within convenient reach of the operator. This switch S4 is shown diagrammatically with its connections in Fig. 11. This switch S4 has three sections S4a, S4b and S4c connected together for joint action. It is adapted to be set manually in either position so that manual steering of the vehicle may be accomplished, or set in position for automatic steering. In the position shown in Fig. 11, the contact S4b is closed, as described above, for automatic operation. When this switch is shifted to its opposite position, the current to the D. C. steering motor 25 is interrupted so that manual steering is possible by the rotation of the steering wheel 9. The mechanical coupling to the steering shaft is also provided with mechanism 29—33 (Fig. 5) to disconnect the motor drive from the steering shaft when manual steering is to be used.

Referring again to Fig. 7, the actuating winding of the relay X1 is shown connected across the terminals 48c and 48d. If an excessively large signal difference, or any other effect, causes the amplidyne generator 24 to produce an unusually high voltage which is impressed on the D. C. steering motor 25, the relay X1 is energized to operate a speed reducing solenoid 51 (Fig. 15) and the implement raising motor 15 (Figs. 1, 2, 12). One side of solenoid 51, contact 70a, is connected (Fig. 7) directly to 65a. The other side, contact 70b, is connected to 50f and through the contacts of S4c to 50e, thence to the contacts of relay X1 and to 47c, which is connected to the other side of the storage battery 66. Thus operation of the solenoid 51 (Fig. 15) can take place only with switch S4 in the "automatic" position (as shown) and then only if an excessive output voltage is obtained from the amplidyne generator 24 at terminals 48c and 48d.

The speed reducing solenoid 51 is shown as connected with a fuel regulating valve 52 which may be connected in the fuel line of the tractor or in the carburetor in the usual manner of controlling the operation thereof. An adjustable connection is shown at 53 (Fig. 15) between the core of the solenoid 51 and the regulating valve 52 to vary the extent of connection therebetween and provide for reduction of speed upon partial closing of the valve.

The regulating valve 52 is connected also by a coiled spring 54 with a lever 55 pivoted at one end, as shown in Fig. 1, while the opposite end thereof is drawn against a notched segment 56 (Fig. 1) to hold the lever 55 adjustably in a set position. The segment 56 is adapted for manual adjustment and will vary the position of the lever 55, thereby varying the position of the regulating valve 52 through the spring 54. The action of the solenoid 51 then increases the tension of spring 54 and acts to close the regulating valve 52. Although this simple mechanical throttle control is used in this embodiment of the invention, it is easily seen that fluid drive, automatic gear shift, or other variable speed drive systems could be adapted easily to achieve similar results.

The operation of the motor 15 to control the raising and lowering of the implement 10 is in turn controlled by a switch S1, shown in Figs. 1 and 12, connected in series with the motor. The switch S1 is adapted to be operated automatically by the cable 11 attached to the implement and to the winding drum 13, which cable has projections 58 and 58' thereon disposed on opposite sides of the swinging arm of the switch in position for engaging and operating the switch arm to move the pole of the switch alternately into engagement with the contacts shown in Fig. 12. These contacts are shown as connected through wires with contacts 57a and 57b, respectively, of the junction box (Fig. 7) while the contact 57c thereof is connected with the opposite side of the motor 15. The double pole relay X5 controls the connections to the several contacts 57a, 57b and 57c, as shown in Fig. 7.

The relay X5 is also shown in Fig. 7 as electrically connected with an external raise and lower switch S2 (Fig. 14), which is shown in Figs. 1 and 3 as mounted on the hood or upper portion of the tractor, and is provided with an elongated bar 59 for operating the switch S2. The bar 59 preferably extends into the path of an arm 60 shown in Figs. 3 and 6, one on each side of the guide path. A similar arm 60 preferably is provided on opposite sides of the path of movement of the tractor into and out of the field so as to control automatically the raising and lowering of the implement as desired, as will be explained hereinafter.

The arm 60 is secured to a hub 61 journaled loosely on the upper end of a post 62 and connected with the post by a torsion spring 63 which normally will tend to hold the arm in the path of the bar 59 on the tractor, as shown in Fig. 3, but will yield to allow swinging of the arm out of such position as the tractor moves past the post. However, the arm 60 will engage the bar 59 of the switch S2 to move the latter to its opposite position as indicated in dotted lines in Fig. 3, thereby shifting the switch S2 to vary the connections, as shown in Fig. 14.

The switch S2 is connected with contacts 64a, 64b and 64c of the junction box shown in Fig. 7. The contact 64b is connected with one side of the coil of the relay X5 while the opposite side of the coil thereof is connected to a contact 65a, the common ground bus, as shown in Fig. 7.

Referring to Fig. 11, the manual-automatic switch S4, described above, is shown with its connections to the contacts 50 of the junction box. This switch is shown with three poles S4a, S4b and S4c adapted for joint actuation to be set manually either in position where the mechanism may be operated manually or where it will operate automatically. The position shown in Fig. 11 is that of automatic operation. In this position the pole S4b closes a circuit between the contacts 50c and 50d, thus permitting electrical operation of the steering motor 25, while the pole S4c closes a circuit between the contacts 50e and 50f permitting electrical operation of solenoid 51 and the raise-lower motor 15 through S2 and X5 in the event of excessive amplidyne output or excessively sharp turning. When shifted to its opposite positions, these connections are broken and the circuits opened, while the pole S4a is shifted into engagement with a contact connected with contact 50b, which line is also connected to the spark coil of the engine as indicated at 67, thus permitting normal manual operation of the vehicle 1.

An ignition switch is shown at S5 in Fig. 11 and which may be mounted on the dash of the tractor, as illustrated in Fig. 1, which ignition switch is connected in series with a second control switch S3, also mounted on the hood of the tractor, in the form illustrated, with an actuating arm 68 extending upwardly therefrom in position to be operated from outside the tractor. This switch makes it possible to stop the tractor automatically by opening the switch S3. Additional switches in series with S3 may be mounted around the front or other parts of the vehicle to stop the latter automatically upon striking any obstruction or object. A horizontal wire stretched over the guide path will engage the arm of the switch S3 to open the switch. The control switches S3 and S5 are connected in series with the contact 50a.

The steering mechanism of the vehicle is provided with turn limit switches to control the steering motor 25. These switches are shown in Fig. 13 and are designated as S7a, S7b, S7c and S7d. The switches S7a and S7b are normally closed and are connected in series between the contacts 68a and 68b of the junction box (Fig. 7), while the switches S7c and S7d are normally open and are connected in parallel in a circuit between the contacts 68c and 68d. These several limit switches have spring pressed arms in the path of an actuating cam 69 (Fig. 13) carried by a bar 70, shown in Fig. 1 as mounted in suitable guides 71 on the tractor for sliding movement relative thereto. The bar 70 is provided with a loose connection 72 to the arm 6 of the steering mechanism.

In the operation of the tractor, if an excessively large signal differential causes the amplidyne generator 24 to discharge an unusually high voltage to the steering motor 25, the relay X1 is closed, thereby energizing the speed reducing solenoid 51 to cause a partial closing of the regulating valve 52, reducing the speed of the tractor. This is effected electrically as follows: the closing of the relay X1 completes the circuit from 47c to 68d to 68c to 50e. As shown in Fig. 11, the contact 50e is connected through switch S4c to the contact 50f, and from the latter the circuit is closed through a wire to contact 70b, thence through the solenoid 51 (Fig. 15) to the contact 70a which is connected with the opposite side of the source of current, 47a, 65a, these two being connected together. The energizing of 50f also supplies 6-volt power to 64c and, should the switch S2 be in the position shown (implements automatically controlled) energizes relay X5 through contact 64b. The energizing of the relay X5 closes a circuit, as described above, through the implement raising motor 15, assuming the switches are in their automatic positions, whereby the motor 15 operates the implement moving mechanism, as shown in Fig. 1.

If the switch S2 is in the position to raise the implement, the six-volt current passes from the terminal 47c to the terminal 64a, through the switch S2, in the opposite position from that shown in Fig. 14, to the terminal 64b, thence to the relay X5, thereby holding the switch contacts of the relay X5 to operate the motor 15 in a direction to raise the implement. The switch S2 is mounted on the tractor in such position that it will be shifted from the "Implement up" position to the automatic position shown in Fig. 14 when the tractor enters the field, ready for lowering of the implement when it is ready for operation. It will be switched again to the "Implement up" position by the arm 60 as the tractor leaves the field, thus preventing accidental lowering of the implement into contact with the road when traveling between fields or when not in use.

In the positions of the parts shown in Fig. 7 and Fig. 14, the implement is down and in operation. In this position, the six-volt current passes from the contact 57b to the upper contact of the switch S1 (Fig. 12). If the switch S1 is in the position shown in Fig. 12, the implement has been moved to its lower position and the circuit is broken at the upper contact of the switch. However, if the switch S1 is in the upper position, the six-volt current is passed through the switch to the motor 15 to operate the latter in a direction to lower the implement until the lower limit abutment 58' (Fig. 1) on the cable 11 engages the operating arm of the switch S1.

After the implement is lowered and in its lowered position, with the switch S2 in the automatic position as shown in Fig. 12, the current is supplied from contact 57a through the switch S1, and the motor 15 to the contact 57c operating the motor to wind up the cable 11 until the abutment 58 on the cable engages the trip arm of the switch S1. The relay X1 will be closed by an excessive turning voltage from the amplidyne, as described above, energizing the solenoid 51 (Fig. 15) and raising the implements automatically.

If the tractor attempts to make a sharp turn, the cam 69 connected with the bar 70 attached to the steering mechanism thereof, shown in Figs. 1 and 13, will engage the limit switch S7c and S7d. The actuation of the limit switch will close a circuit between the contacts 68c, 68d, which are connected across the contacts of the relay X1, thereby closing the circuit to the implement raising motor 15 and speed reducing solenoid 51 even though the relay X1 should be de-energized. This will act automatically to raise the implement and slow the vehicle if an excessive turn should be attempted by the vehicle.

The relay X4 is adapted to be energized jointly with the relay X3 when the tractor is being prepared for automatic operation and so long thereafter as the tractor continues in operation. The six-volt current is connected in a circuit from the terminal 65b to the coils of the relays X3 and X4. The relay X3 closes the contacts of the energizing circuit, while the energizing of the relay X4 closes a contact switch in the return circuit to the contact 47b which is connected directly with the contact 47c. All six-volt power for running the tractor is supplied through contacts 65a, 65b. The six-volt power needed in automatic operation is supplied through 47a, 47b, and 47c. The six-volt heater supply for the thyratrons T1 and T2 is supplied from 47a and 47b as is also the power for the raise-lower motor 15 and the speed reducing solenoid 51.

When the relay S4 (Fig. 11) is in the manual position, opposite from that shown in Fig. 11, and the ignition switch S5 is closed, the vehicle may be started and is ready for manual operation. In this position, the vehicle may be operated in the usual way under the control of the operator, both as to steering and as to the control of power, the steering being permitted, as described above, in which event the steering motor 25 may be positively disconnected from the steering shaft 8 by the operation of the flexible device 29—33. In this position, the implement may be lowered and raised by the manual operation of the switch S2, the circuits functioning as described above.

The relay X3 is energized through the contact 50b whenever ignition switch S5 is closed and switch S4 is in the "manual" position. In order to prepare for automatic operation, the switch S3 is closed manually. This closes the circuit through the switches S3, S5 (Fig. 11) in a circuit, one side of which is grounded at the latter and the other side of which extends to the contact 50a, thence to contact 68a, through the limit switches S7a, S7b, which are normally closed, to contact 68b, to the contacts of relay X2. Contact 50a is connected through the upper contacts of relay X3 to energize relay X4, supplying power to the heater elements of the control unit as shown in Fig. 8. As the control circuit becomes inoperative, relay X2 closes. Unless the wheels of the tractor are turned too sharply, the limit switches S7a and S7b are both closed as described above, and the circuit is completed from contact 50a to contact 68a, through the limit switches to contact 68b through the contacts of relays X2 and X3 to contact 50b. When switch S4 is now thrown into the "automatic" position, the return path through contact 50b energizes the spark coil while the relay X3 is held by the circuit through contact 50a described above.

The relays X2, X3 and X4 will now be energized and will hold in the closed positions, whereby the output of the control unit and the output of the amplidyne generator 24 will be connected to the respective parts for automatic operation, as described above.

If the vehicle should deviate from its guide path because of any failure, the relay X2 would be de-energized, thereby breaking the ignition circuit for the vehicle engine and allowing the relay X3 to open since it and the relay X4 will be deenergized automatically, thereby stopping the vehicle. Similarly, the same action would result if the wheels of the vehicle should assume an excessive turn position because of failure of control or for any other reason. However, normally the control would prevent such an extreme operation of the steering mechanism. This circuit makes it impossible for the vehicle merely to cruise about the farm or place of use out of control. In that event, the tractor is stopped completely and it may be stopped also automatically by engagement of a horizontal wire or other element with the switch S3 to open the latter.

If the vehicle should attempt to make either a sharp turn or to change its course very rapidly, the implement is raised and the vehicle speed reduced, as described above. The purpose of this is to prevent accidental separation of the vehicle entirely from the guide course or path to protect the implement on sharp turns.

Referring to the detector unit shown in Fig. 9, the coil 41 is excited by the voltage of the A. C. generator 22 which creates a magnetic field near the ground in front of the vehicle. This field is detected by the receiving coils 42 and 43. In the presence of a buried wire or a guide path otherwise provided, the magnetic field is distorted. If this wire be located directly beneath or above the coil 41, the effect on the coils 42 and 43 is identical. If, however, the wire be located laterally at one side of the coil 41, the magnetic field on this side is increased, thereby increasing the voltage in the corresponding coil 42 or 43.

The foregoing description is based on the assumption that small thyratrons, such as No. 2015, are used. If larger thyratrons are used capable of handling sufficient current, two alternate circuits are possible with simplification of construction, reducing the number of elements of the circuits and the complexity thereof.

If a single D. C. steering motor is used with such larger thyratrons, all wires may be omitted from the amplidyne generator 24, and the contact 47i may be connected directly to the contact 49a while the contact 47j is connected directly to the contact 50d. This will connect the relay X1 with its coil across the contacts 47i, 47j in the junction box and the operation otherwise will be substantially the same as described.

It may also be possible in using large thyratrons and omitting the amplidyne generator 24 to employ two D. C. motors connected mechanically with the steering shaft so that the current of one of the thyratrons will pass through each motor. When the currents are equal the motors will maintain the steering apparatus in a central position with no change of position taking place, but in the event of a change of current the steering apparatus will shift in accordance therewith since the reduced current through one of the thyratrons will cause a drop in torque on the corresponding motor while the other motor will be increased in torque, thereby effecting the desired change in the direction of the vehicle.

In this event, the resistors R3, R4 are omitted, but the resistor R5 is retained for bias. The connections 47i, 47j are then connected directly to 49a and 50d, as described above. An additional connection 47p is provided which may be connected directly to the common negative leads of the two motors, while their positive leads are connected respectively to the contacts 49a and 49b. The advantage of this circuit is that the total difference of current of the two thyratrons is utilized, although it may require special motors.

If there should be too much coupling between the transmitting and receiving coils 41, 42, 43, this may be reduced by partially shielding the receiving coils, or appropriate transformers may be used to inject a small amount of the in-phase and quadrature output current into each receiving circuit so as to balance the normal pickup in the absence of the buried wire.

The switch S12 comprising the double poles S12a and S12b, shown in Fig. 8, is included so that while the machine is following a guide path whose characteristics are such as to produce an in-phase signal, the thyratrons will have in-phase A. C. current on their plates with the switch elements in the position shown in Fig. 8. Upon swinging the poles to the opposite positions, the quadrature signal will appear on the thyratron plates and they will become sensitive to a wire or other guide path means from which the received signal is larger in quadrature with the exciting signal.

This provides a method whereby the tractor may follow either of two paths about the same field, thus providing for greater flexibility of operation. Different wires may be used for the different currents and so positioned as to guide the tractor along one path and then the other. The tractor will follow the wire for which it is set to the end of its course and then follow the other.

If the wire be a good conductor so that the reactance is primarily inductive, then the voltage appearing across the receiving coils will be primarily in quadrature with that driving the transmitting coil. The greater the resistance of the buried wire the more the received voltage will be in phase with the driving voltage. If, on the other hand, the coils are mounted with their axes parallel with the buried wire, they will not be sensitive to change unless it be made of a magnetic material such as iron or steel. If the wire is magnetic, then the induced voltage in receiving coils will be in-phase with the driving voltage of the transmitting coil.

The several possible orientations of the transmitting and receiving coils and the guide path wire will now be discussed. Three orientations are possible, as follows:

(a) The axes of all three coils horizontal and parallel to the wire, (b) The axis of the transmitting coil vertical and the axes of the receiving coils horizontal and perpendicular to the wire, (c) The axis of the transmitting coil horizontal and the axes of the receiving coils vertical.

In addition, the guide-path wire, tape or other material, may be:

(1) Magnetic, such as of iron or steel, (2) Non-magnetic and offering a path of current which appears to be primarily resistive, (3) Non-magnetic and offering a path of current which appears to be largely reactive.

The table below gives combinations which are possible with in-phase voltage applied to the thyratrons ($i$), with quadrature voltage applied to the thyratrons ($q$) and, those probably not usable ($n$).

|   | a | b | c |
|---|---|---|---|
| 1 | $i$ | $i$ | $i$ |
| 2 | $n$ | $i$ | $i$ |
| 3 | $n$ | $q$ | $q$ |

Arrangements 2b and 2c would be followed in preference to 1b and 1c although all are possible. It is seen that by changing the character of the wire and the orientation of the coils, several different paths could be followed in the same field.

There are several other methods of preparing guide path and obtaining differential following of such a guide path than the use of a wire buried in the ground.

The types of path detection contemplated in this invention may be conveniently divided into three types: magnetic, electric, and very high frequency. These will be described in turn below. In a general sense, however, they are all direct applications of electromagnetic theory and could all be described mathematically by the general equations of electromagnetic theory.

(a) Magnetic: A wire or tape is provided, usually buried, which influences the coupling between the primary or transmitting coil and the receiving or secondary coils. Depending on the type of wire and the orientation of the coils, the signals received via the wire may be either in phase with the signal in the transmitting coil or in quadrature with it. In either case, the magnitudes and phases of the signals may be compared with reference to voltages and with each other so as to obtain an error signal indicating the direction and magnitude of the steering error.

Two methods appear obvious for determining this error. First, one transmitting coil and two receiving coils may be used, comparing the signals in the two receiving coils. Second, two transmitting coils may be used, excited in opposite phase so that their signals normally just cancel each other, and the signal from the single receiving coil put through a phase comparison circuit to determine the direction and magnitude of either the in-phase or quadrature signal.

(b) Electric: Here again a wire, tape or other material, either conductive or dielectric, may be assumed. If the soil with a buried track is used as the dielectric of two condensers and the capacity and/or loss factors are compared, the arrangement of condenser plates would be as follows: two plates perhaps a foot in diameter (but not necessarily circular) located in front of the tractor, one on each side, approximately ahead of the front wheels, and a single plate located between the front wheels, all three plates being parallel to the ground so that the electric fields between the plates would go partly through the ground. The effect of the tape or wire would be to increase the capacity of the condensers so formed either by increasing the average dielectric constant between either or both of the front plates and the rear plate or by conducting current between the two ends, thus reducing the distance through the dielectric and thus increasing the capacitance of either or both of the condensers.

In the event that the buried wire or tape is not symmetrically placed with respect to the two condensers, the capacitance of one is increased more than that of the other. If the capacitances be connected in series with resistances and an A. C. generator of appropriate frequency, then the voltages either across the resistances or across the capacitances vary with the value of the capacitance of the circuit and these voltages may be applied in a phase detection circuit (just similarly to the magnetic case) and produce the tracking error signal. A combination of magnetic and electric detection could be used to provide for further flexibility of operation (such as following different paths) although this would require more complicated detector units and tracking circuits.

(c) Very high frequency: Again the soil may be prepared by burying a metallic or dielectric wire or tape. In this case the detector would contain a very high frequency electro-magnetic (or optical) wave generator (i. e., 50 megacycles per second or higher) and one or more transmitting antennae and one or more receiving antennae. Here one may operate with either the phase or amplitude of the received signals, or using only the transmitting antennae, one may operate with their change of imput impedance. Using the received phase characteristics, one may employ phase detector circuits at the high frequency. The phase varies with the distance of the wire from the antennae, and with proper circuits one can make the vehicle steer so as to keep the phases constant. Using the received amplitude, one can operate directly with two detector tubes or crystals and cause the tractor to steer so as to keep the detected signals equal. Using the imput impedance principle, one can set out detectors at voltage minima along the feeder lines to two symmetrically placed transmitting antennae and compare the detected signals in amplitude, thus steering to maintain equal minima. For the purpose of obtaining exact tracking, one may determine the optimum location of the detectors.

While the invention has been described as applicable to vehicles of the type operating on land, it may be applied to air vehicles in the same manner, especially for maintaining the direction of the vehicle, as when operated by automatic controls. The height may be maintained by simple barometric instruments or altimeter, as are well known.

It is also recognized that other variations and changes may be made in the invention as described except as specified in the claims.

I claim:

1. In a vehicle having power operated propelling means, power operated direction controlling means for the vehicle, an implement connected with the vehicle, raising and lowering means for the implement, means for automatically controlling the raising and lowering of the implement, a detector unit on the vehicle including a transmitting coil and a plurality of receiving coils on opposite sides of the transmitting coil, a source of A. C. current connected with the transmitting coil for creating an electro-magnetic field adjacent thereto for exciting said receiving coils, a linear metallic guide path strand externally of the vehicle in position to influence the effect of the electro-magnetic field on the respective receiving coils, and electric motor means connected with the receiving coils for operating the vehicle direction control means.

2. In a vehicle having power operated propelling means, power operated direction controlling means for the vehicle, an implement connected with the vehicle, means for automatically controlling the raising and lowering of the implement, a detector unit on the vehicle including a transmitting coil and a plurality of receiving coils on opposite sides of the transmitting coil, a source of A. C. current connected with the transmitting coil for creating an electro-magnetic field adjacent thereto for exciting said receiving coils, a linear metallic guide path strand externally of the vehicle in position to influence the effect of the electro-magnetic field on the respective receiving coils, and electric motor means connected with the receiving coils for operating the vehicle direction control means, and a second electric motor means for raising the implement automatically upon making an appreciable change in the vehicle direction.

3. In a vehicle having power operated propelling means, power operated direction controlling means for the vehicle, an implement connected with the vehicle, raising and lowering means for the implement, means for automatically controlling the raising and lowering of the implement, a detector unit on the vehicle including a transmitting coil and a plurality of receiving coils on opposite sides of the transmitting coil, a source of A. C. current connected with the transmitting coil for creating an electro-magnetic field adjacent thereto for exciting said receiving coils, a linear metallic guide path strand externally of the vehicle in position to influence the effect of the electro-magnetic field on the respective receiving coils, electric motor means connected with the receiving coils for operating the vehicle direction control means, and means for actuating the implement raising and lowering means in response to the relation of the vehicle to the guide path strand.

4. In a vehicle control device, the combination with a non-energized magnetic guide path strand adapted to form a linear path of movement of the vehicle, of apparatus carried by the vehicle for guiding the movement thereof comprising a transmitting coil arranged on the vehicle in position to overlie said guide path strand and a pair of receiving coils on opposite sides of the transmitting coil, and means connected with the transmitting coil for creating a magnetic field adjacent thereto and in the region of the guide path strand in position to be detected electro-magnetically by the receiving coils.

References Cited in the file of this patent

UNITED STATES PATENTS

| | | |
|---|---|---|
| 2,074,251 | Braun | Mar. 16, 1937 |
| 2,252,349 | Mott | Aug. 12, 1941 |
| 2,339,291 | Paulus et al. | Jan. 18, 1944 |
| 2,363,292 | Brown | Nov. 21, 1944 |
| 2,405,334 | Silver | Aug. 6, 1946 |
| 2,414,602 | Mott | Jan. 21, 1947 |
| 2,424,288 | Severy | July 22, 1947 |
| 2,484,069 | Boncompain | Oct. 11, 1949 |
| 2,493,755 | Ferrill | Jan. 10, 1950 |
| 2,590,574 | Robinson | Mar. 25, 1952 |
| 2,663,518 | Muffly | Dec. 22, 1953 |